United States Patent
Yonemura et al.

(10) Patent No.: US 9,249,706 B2
(45) Date of Patent: Feb. 2, 2016

(54) METHOD FOR REGENERATING EXHAUST GAS TREATMENT CATALYST

(75) Inventors: Masanao Yonemura, Minato-ku (JP);
Katsumi Nochi, Minato-ku (JP);
Masashi Kiyosawa, Minato-ku (JP);
Masanori Demoto, Minato-ku (JP);
Kyohei Takakura, Minato-ku (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 106 days.

(21) Appl. No.: 14/347,775

(22) PCT Filed: Nov. 17, 2011

(86) PCT No.: PCT/JP2011/076500
§ 371 (c)(1),
(2), (4) Date: May 28, 2014

(87) PCT Pub. No.: WO2013/073032
PCT Pub. Date: May 23, 2013

(65) Prior Publication Data
US 2014/0250867 A1    Sep. 11, 2014

(51) Int. Cl.
*B01J 38/60* (2006.01)
*F01N 3/18* (2006.01)
*B01D 53/96* (2006.01)
*B01J 27/232* (2006.01)
*B01D 53/86* (2006.01)
*B01J 38/48* (2006.01)
*B01J 27/053* (2006.01)
*B01J 27/30* (2006.01)
*B01J 37/02* (2006.01)
*B01J 35/00* (2006.01)

(52) U.S. Cl.
CPC ............. *F01N 3/18* (2013.01); *B01D 53/8628* (2013.01); *B01D 53/96* (2013.01); *B01J 27/053* (2013.01); *B01J 27/232* (2013.01); *B01J 27/30* (2013.01); *B01J 35/002* (2013.01); *B01J 37/0215* (2013.01); *B01J 38/485* (2013.01); *B01D 2251/404* (2013.01); *B01D 2255/2045* (2013.01); *B01D 2255/20707* (2013.01); *B01D 2255/20723* (2013.01); *B01D 2255/20776* (2013.01); *B01D 2255/30* (2013.01); *B01J 35/0006* (2013.01); *B01J 38/60* (2013.01)

(58) Field of Classification Search
CPC ........................................................ B01J 38/60

USPC ............................ 502/27, 514, 515, 516, 518
See application file for complete search history.

(56) References Cited

U.S. PATENT DOCUMENTS

| | | | |
|---|---|---|---|
| 5,451,558 A | 9/1995 | Campbell et al. | |
| 5,607,650 A | 3/1997 | Debbage et al. | |
| 5,665,321 A | 9/1997 | Campbell et al. | |
| 2005/0192176 A1 | 9/2005 | Obayashi et al. | |
| 2008/0220966 A1 | 9/2008 | Obayashi et al. | |

FOREIGN PATENT DOCUMENTS

| | | |
|---|---|---|
| EP | 1 266 689 | 12/2002 |
| JP | 58-189041 | 11/1983 |
| JP | 62-57382 | 12/1987 |
| JP | 4-367724 | 12/1992 |
| JP | 10-500054 | 1/1998 |
| JP | 10-156192 | 6/1998 |
| JP | 3059136 | 7/2000 |
| JP | 3059137 | 7/2000 |
| JP | 2001-113176 | 4/2001 |
| JP | 3224708 | 11/2001 |
| JP | 2005-126317 | 5/2005 |
| JP | 3724696 | 12/2005 |
| JP | 4436124 | 3/2010 |
| JP | 4578624 | 11/2010 |

OTHER PUBLICATIONS

Extended European Search Report issued Jun. 9, 2015 in corresponding European Application No. 11875762.4.
International Preliminary Report on Patentability and Written Opinion of the International Searching Authority issued Jun. 19, 2014 in International (PCT) Application No. PCT/JP2011/076500.
Chinese Office Action issued Apr. 23, 2015 in corresponding Chinese Patent Application No. 201180073708.4 with English translation.
International Search Report issued Mar. 6, 2012 in International (PCT) Application No. PCT/JP2011/076500.

*Primary Examiner* — Edward Johnson
(74) *Attorney, Agent, or Firm* — Wenderoth, Lind & Ponack L.L.P.

(57) ABSTRACT

Provided is an exhaust gas treatment catalyst including: a de-NOx catalyst; and a coating layer being provided on a surface of the de-NOx catalyst and containing at least one selected from the group consisting of alkali metal carbonates and alkaline earth metal carbonates.
In a method for regenerating an exhaust gas treatment catalyst of the present invention, the coating layer of the de-NOx catalyst on which $VOSO_4$ is deposited is removed with an acid, and after the removal of the coating layer, a coating layer containing at least one selected from the group consisting of alkali metal carbonates and alkaline earth metal carbonates is again provided.

4 Claims, 5 Drawing Sheets

METHOD FOR REGENERATING EXHAUST GAS TREATMENT CATALYST

TECHNICAL FIELD

The present invention relates to an exhaust gas treatment catalyst, and particularly to an exhaust gas treatment catalyst for removing nitrogen oxides from an exhaust gas emitted from a combustion apparatus such as a high sulfur content fuel-fired boiler, a method for producing the exhaust gas treatment catalyst, and a method for regenerating the exhaust gas treatment catalyst.

As a method for removing nitrogen oxides (NOx) in a combustion exhaust gas from a combustion apparatus such as a boiler, the ammonia catalytic reduction method has been put to practical use. In the ammonia catalytic reduction method, NOx is decomposed into harmless nitrogen and water by using ammonia ($NH_3$) as a reducing agent in the presence of a nitrogen oxide removal catalyst (hereinafter referred to as ""de-NOx catalyst").

Meanwhile, extra heavy oils such as Orimulsion [(trade name of Mitsubishi Corporation); an oil-in-water emulsion obtained by mixing an extra heavy oil (Orinoco tar) collected in Orinoco State, Venezuela with water and a surfactant to facilitate the handling at normal temperature], asphalt, and vacuum residual oil (VOR) contain 2 to 3 times as much sulfur and 5 to 7 times as much vanadium (in the order of magnitude of a few percent) as fuel oil C. In addition, $SO_2$ concentrations in combustion exhaust gases thereof are very high.

The dust of a high sulfur content fuel-fired boiler using such a fuel contains vanadium in the order of magnitude of a few percent as described above. For this reason, during operation, a vanadium compound is deposited on the surface of the de-NOx catalyst used.

The above-described vanadium is an active component of a de-NOx catalyst. However, vanadium is a substance which also promotes a $SO_2$ oxidation reaction as a side reaction, on the other hand.

Because of the vanadium deposited, the $SO_2$ oxidation reaction rate increases with time in an actual system, and consequently corrosive $SO_3$ emitted to the downstream increases more and more. In addition, under an environment with a SOx concentration in exhaust gas being 2000 ppmvd or higher, a $VOSO_4$ film is deposited on the catalyst surface, and inhibits the diffusion of gas into the de-NOx catalyst, causing deterioration in de-Nox performance of the de-NOx catalyst.

Here, an attempt has been made to inhibit the increase in $SO_2$ oxidation rate with time by coating a surface of a de-NOx catalyst with a metallosilicate (Patent Document 1: Japanese Patent No. 3224708).

Although the permeation of $VOSO_4$ to the de-NOx catalyst is inhibited by the above-described approach, the increase in $SO_2$ oxidation rate with time due to the $VOSO_4$ film deposited on the metallosilicate coating layer cannot be avoided. Hence, in the use of such a metallosilicate coating layer, a regenerate treatment for removing the $VOSO_4$ film is necessary.

Note that Japanese Patent No. 4436124 (Patent Document 2), which relates to a scheme to wash a de-NOx catalyst with water, has been granted to the applicant.

PRIOR ART DOCUMENTS

Patent Documents

[Patent Document 1] Japanese Patent No. 3224708
[Patent Document 2] Japanese Patent No. 4436124

SUMMARY OF INVENTION

Technical Problems

The present invention has been made under the above circumstances, and an object of the present invention is to provide an exhaust gas treatment catalyst which makes it possible to effectively inhibit the permeation of $VOSO_4$ to the inside of the de-NOx catalyst and also to easily remove deposited $VOSO_4$ for restoring the de-Nox performance, as well as a method for producing the exhaust gas treatment catalyst and a method for regenerating the exhaust gas treatment catalyst.

Solution to Problems

To achieve the object, an exhaust gas treatment catalyst according to the present invention includes: a de-NOx catalyst; and a coating layer being provided on a surface of the de-NOx catalyst and containing at least one selected from the group consisting of alkali metal carbonates and alkaline earth metal carbonates.

Another aspect of the present invention is a method for producing an exhaust gas treatment catalyst. The production method includes: immersing a de-NOx catalyst in a slurry for wash-coating containing at least one selected from the group consisting of alkali metal carbonates and alkaline earth metal carbonates; and drying the de-NOx catalyst after the immersion, thereby providing a coating layer containing the at least one selected from the group consisting of alkali metal carbonates and alkaline earth metal carbonates on a surface of the de-NOx catalyst.

Moreover, still another aspect of the present invention is a method for regenerating an exhaust gas treatment catalyst, in which a coating layer containing at least one selected from the group consisting of alkali metal carbonates and alkaline earth metal carbonates is provided on a surface of a de-NOx catalyst, and $VOSO_4$ is deposited on the coating layer. This regeneration method includes removing only the coating layer of the de-NOx catalyst with an acid. In an embodiment of the regeneration method, after the removal of the coating layer with the acid, a coating layer containing at least one selected from the group consisting of alkali metal carbonates and alkaline earth metal carbonates is provided again.

The alkaline earth metal carbonate employable for the coating layer is preferably calcium carbonate. The alkaline earth metal carbonate employable for the coating layer provided again is also preferably calcium carbonate.

In addition, as the acid, hydrochloric acid, nitric acid, or sulfuric acid can be used, and hydrochloric acid is the most preferable.

Advantageous Effects of Invention

The present invention provides an exhaust gas treatment catalyst which makes it possible to effectively inhibit permeation of $VOSO_4$ to the inside of the de-NOx catalyst and to easily remove deposited $VOSO_4$ for restoring the de-Nox performance, as well as a method for producing the exhaust gas treatment catalyst and a method for regenerating the exhaust gas treatment catalyst.

DESCRIPTION OF EMBODIMENT

Hereinafter, preferred embodiments of an exhaust gas treatment catalyst, a method for producing an exhaust gas treatment catalyst, and a method for regenerating an exhaust gas treatment catalyst according to the present invention are described.

The exhaust gas treatment catalyst according to the present invention includes: a de-NOx catalyst; and a coating layer being provided on a surface of the de-NOx catalyst and containing at least one selected from the group consisting of alkali metal carbonates and alkaline earth metal carbonates.

The de-NOx catalyst for exhaust gas to which the present invention is applied is not particularly limited, and examples thereof include various catalysts such as one in which vanadium and tungsten components are supported on a support containing silica and/or titania, one in which only a tungsten component is supported thereon, one in which vanadium and molybdenum components are supported thereon, and those in which other active components are supported thereon.

Regarding the shape of the de-NOx catalyst, a honeycomb-shaped de-NOx catalyst is preferably employed.

The removal treatment catalyst for exhaust gas according to the present invention is produced by providing a coating layer containing at least one selected from the group consisting of alkali metal carbonates and alkaline earth metal carbonates on a surface of the above-described de-NOx catalyst.

The coating layer needs to have a capability of effectively inhibiting permeation of $VOSO_4$ to the inside of the de-NOx catalyst and also to have a capability of easily removing deposited $VOSO_4$.

For providing the coating layer, first, a slurry for wash-coating containing at least one selected from the group consisting of alkali metal carbonates and alkaline earth metal carbonates is prepared.

Subsequently, the de-NOx catalyst is immersed in the prepared slurry for wash-coating. After the de-NOx catalyst is taken out, the slurry in excess is removed. After that, the de-NOx catalyst is dried at 80° C. to 150° C., and then calcined at 300° C. to 600° C. Thus, an removal treatment catalyst for exhaust gas provided with a desired coating layer can be obtained.

In a case of a honeycomb substrate (de-NOx catalyst), the amount of the coating layer coated is preferably 20 g/m² to 100 g/m² of the surface area of the honeycomb substrate, in general.

The exhaust gas treatment catalyst according to the present invention is intended to be used for an extra heavy oil such as Orimulsion, asphalt, or vacuum residual oil (VOR), coal having a high sulfur content, or the like. The exhaust gas treatment catalyst according to the present invention is applied as a treatment catalyst for an exhaust gas emitted from an combustion apparatus such as a boiler in which such a high sulfur content fuel is combusted.

Under such an environment of treatment for exhaust gas, $VOSO_4$ is deposited on the coating layer of the de-NOx catalyst.

Figure 1:
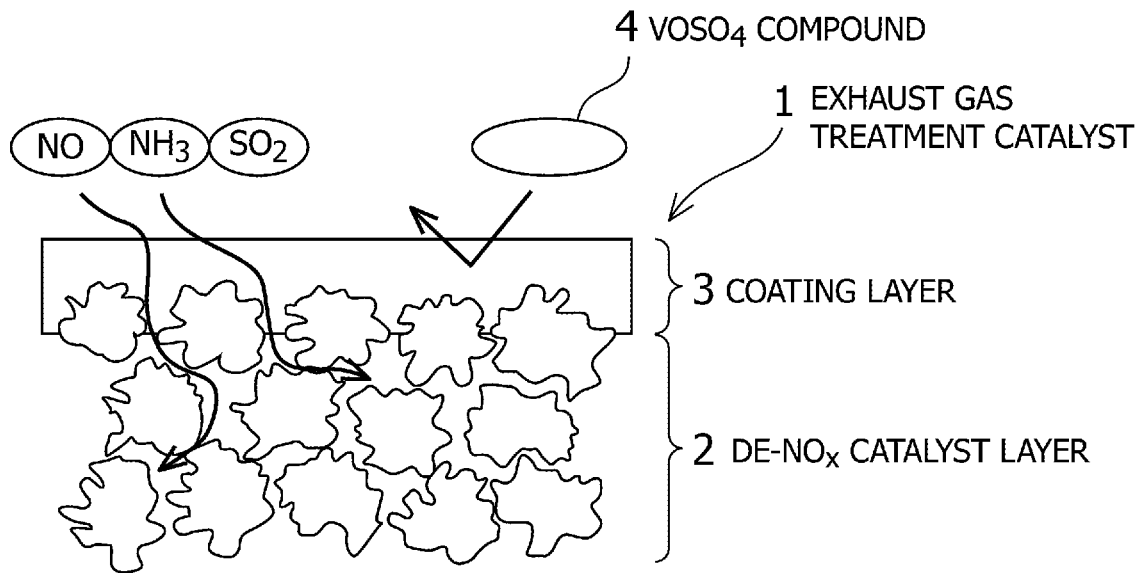
FIG. 1 is a conceptual diagram schematically showing a cross-sectional structure of an exhaust gas treatment catalyst according to the present invention.

This phenomenon is shown with reference to a schematic diagram in FIG. 1.

FIG. 1 shows a cross-section of an embodiment of the exhaust gas treatment catalyst according to the present invention.

An exhaust gas treatment catalyst 1 includes: a de-NOx catalyst layer 2 shown as a particle layer; and a coating layer 3 on a surface of the de-NOx catalyst layer 2.

A $VOSO_4$ molecule 4 is blocked by the coating layer 3, and the permeation thereof to the de-NOx catalyst layer 2 is inhibited. On the other hand, molecules of treatment targets such as NO, $NH_3$, and $SO_2$ can diffuse to the inside of the de-NOx catalyst layer 2. Although the $VOSO_4$ molecule 4 is blocked by the coating layer 3, $VOSO_4$ is deposited on the coating layer 3 in a long-term use.

In a method for regenerating an exhaust gas treatment catalyst according to the present invention, only the coating layer on which $VOSO_4$ is deposited is removed with an acid.

As a method for the removal, washing with an acid is preferable. Examples of the acid used include hydrochloric acid, sulfuric acid, and nitric acid. When hydrochloric acid is used, the concentration is preferably in a range from 0.01 N to 5 N. When sulfuric acid is used, the concentration is preferably in a range from 0.01 N to 5 N.

In the method for regenerating an exhaust gas treatment catalyst according to the present invention, then, another coating layer containing at least one selected from the group consisting of alkali metal carbonates and alkaline earth metal carbonates is provided again on the de-NOx catalyst from which the coating layer has been removed. A method for providing the coating layer may be the same as the method for providing the removed coating layer.

EXAMPLES

Hereinafter, the present invention is described more specifically based on Examples.

Example 1

Production of Honeycomb Catalyst

A 13% by weight calcium carbonate slurry for wash-coating was prepared by using an extra pure grade calcium carbonate (manufactured by HAYASHI PURE CHEMICAL IND., LTD.) as follows. Specifically, 1500 g of the calcium carbonate powder was added to 4884 g of water, and sufficiently stirred and ground with a ball mill, followed by slurry adjustment.

Next, a honeycomb substrate (cell pitch: 7.0 mm, wall thickness: 1.0 mm) having a composition of 96% by weight $TiO_2$—$SiO_2$-1% by weight $V_2O_5$-3% by weight $WO_3$ was immersed in the slurry for wash-coating, and then taken out. After that, the slurry in excess was removed, and the honeycomb substrate was dried at 150° C. The coated amount was 25 g/m² of the substrate. This coated article is referred to as Test Honeycomb Catalyst B.

Comparative Example 1

Production of Honeycomb Catalyst

A solution obtained by dissolving 5616 g of No. 1 water glass (SiO2: 30%) in 5429 g of water was employed as Solution D. On the other hand, a solution obtained by mixing, for dissolution, 4175 g of water, 718.9 g of aluminum sulfate, 110 g of iron(III) chloride, 47.2 g of calcium acetate, 262 g of sodium chloride, and 2020 g of concentrated hydrochloric acid was employed as Solution E. Precipitates were formed by feeding Solution D and Solution E at a constant ratio, followed by sufficient stirring. Thus, a slurry of pH 8.0 was obtained.

This slurry was introduced into a 20-liter autoclave, and 500 g of tetrapropylammonium bromide was further added thereto. Hydrothermal synthesis was carried out at 160° C. for 72 hours. After the synthesis, the product was washed with water, dried, and further calcined at 500° C. for 3 hours. Thus, Crystalline Silicate F was obtained. The mole ratio of oxides in Crystalline Silicate F (excluding water of crystallization) is represented by the following compositional formula, and the crystal structure thereof determined by X-ray diffraction was as shown in Table 1.

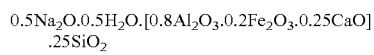

$0.5Na_2O.0.5H_2O.[0.8Al_2O_3.0.2Fe_2O_3.0.25CaO]$
$.25SiO_2$

TABLE 1

| Spacing between lattice planes (d value) | Relative intensity |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: Very strong
S: Strong
M: Medium
W: Weak
(X-ray source: CuKα)

Crystalline Silicate F described above was stirred in a 4 N aqueous $NH_4Cl$ solution at 40° C. for 3 hours to carry out exchange with $NH_4$ ions. After the ion-exchange, the silicate was washed, dried at 100° C. for 24 hours, and then calcined at 400° C. for 3 hours. Thus, H-type Crystalline Silicate F was obtained.

By using the obtained Crystalline Silicate F, a slurry for wash-coating containing 13% by weight of a catalyst powder of Crystalline Silicate F was prepared as follows. Specifically, 1500 g of the powder of Crystalline Silicate F was added to 4884 g of water, and sufficiently stirred and ground with a ball mill, followed by slurry adjustment.

Next, a honeycomb substrate (cell pitch: 7.0 mm, wall thickness: 1.0 mm) having a composition of 96% by weight $TiO_2$—$SiO_2$-1% by weight $V_2O_5$-3% by weight $WO_3$ was immersed in the slurry for wash-coating, and taken out therefrom. Then, the slurry in excess was removed, and the honeycomb substrate was dried at 150° C. The coated amount was 25 g/m² of the substrate, and the coated article is referred to as Test Honeycomb Catalyst C.

Example 2

Each of Honeycomb Catalysts B and C produced in Example 1 and Comparative Example 1 was exposed to an actual gas of a high sulfur oil-fired power generation plant A for approximately 6000 hours. Then, pieces in a size of 5 cells×5 cells×70 mm in length were cut out from Test Catalysts B and Test Catalyst C, and washing tests of the catalysts were carried out by using water and 1 N—HCl (1 normal-hydrochloric acid) as washing liquids. FIG. 1 shows a flow of the washing of the catalysts.

Figure 2:
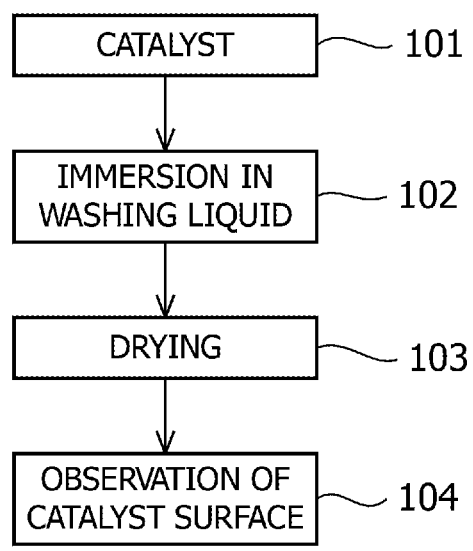
FIG. 2 is a flowchart showing a flow of a regeneration test of an exhaust gas treatment catalyst according to the present invention.

As shown in the flow of the washing of FIG. 2, after a cutting step 101, each catalyst was washed with a washing liquid/catalyst volume ratio of 3.0 at a temperature of 40° C. (when water was used) or at 60° C. (when the acid solution was used) for 4 hours (Step 102). After that, the catalyst was dried at a temperature of 100° C. for 8 hours or more (Step 103).

After that, the surface of the catalyst was visually observed, or analyzed by X-ray diffraction (Step 104).

[Results of Washing Test]

Figure 3:
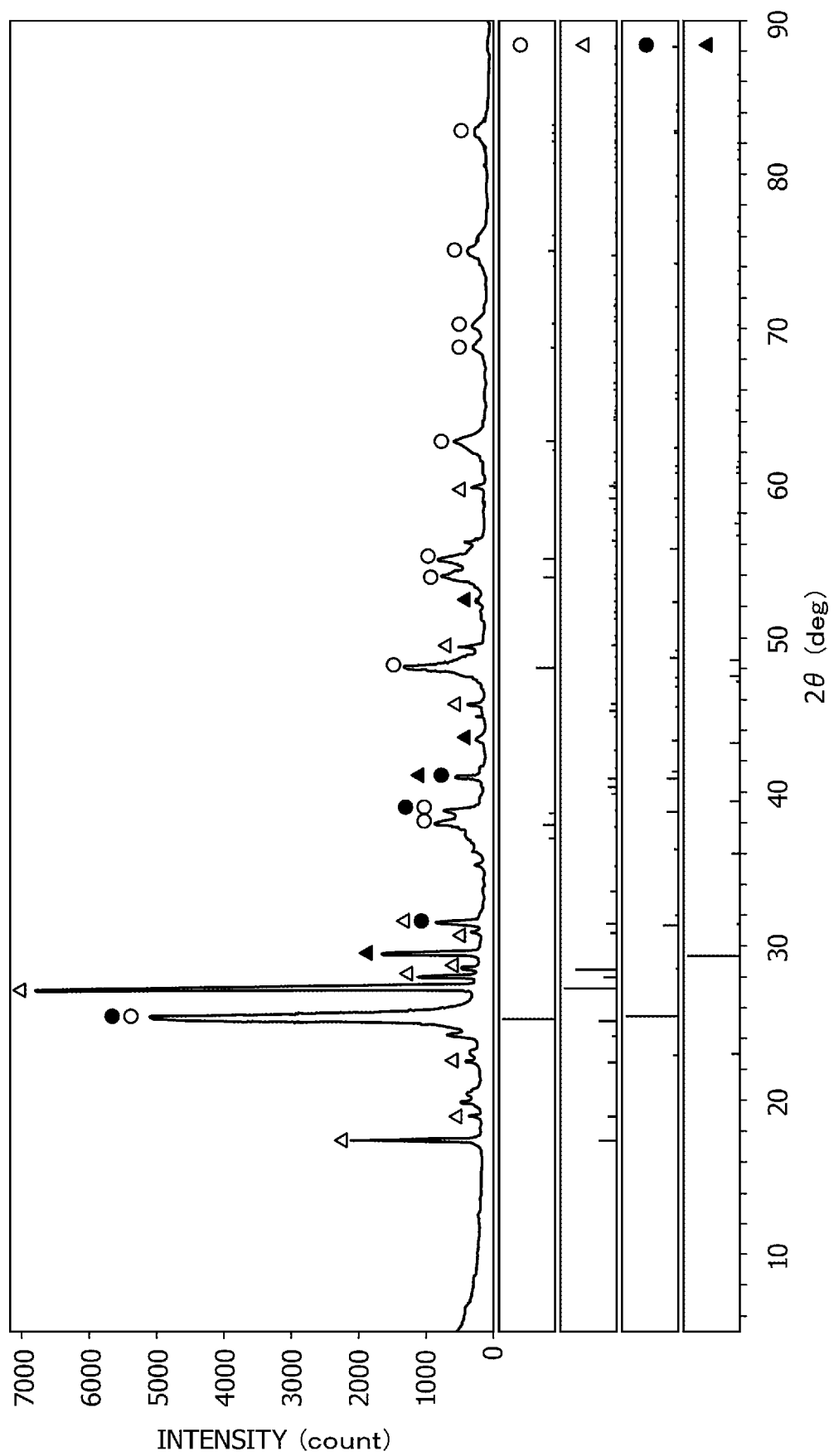
FIG. 3 is a graph showing a surface X-ray diffraction chart of catalyst B according to Example of the present invention which was exposed to an exhaust gas.
Figure 4:
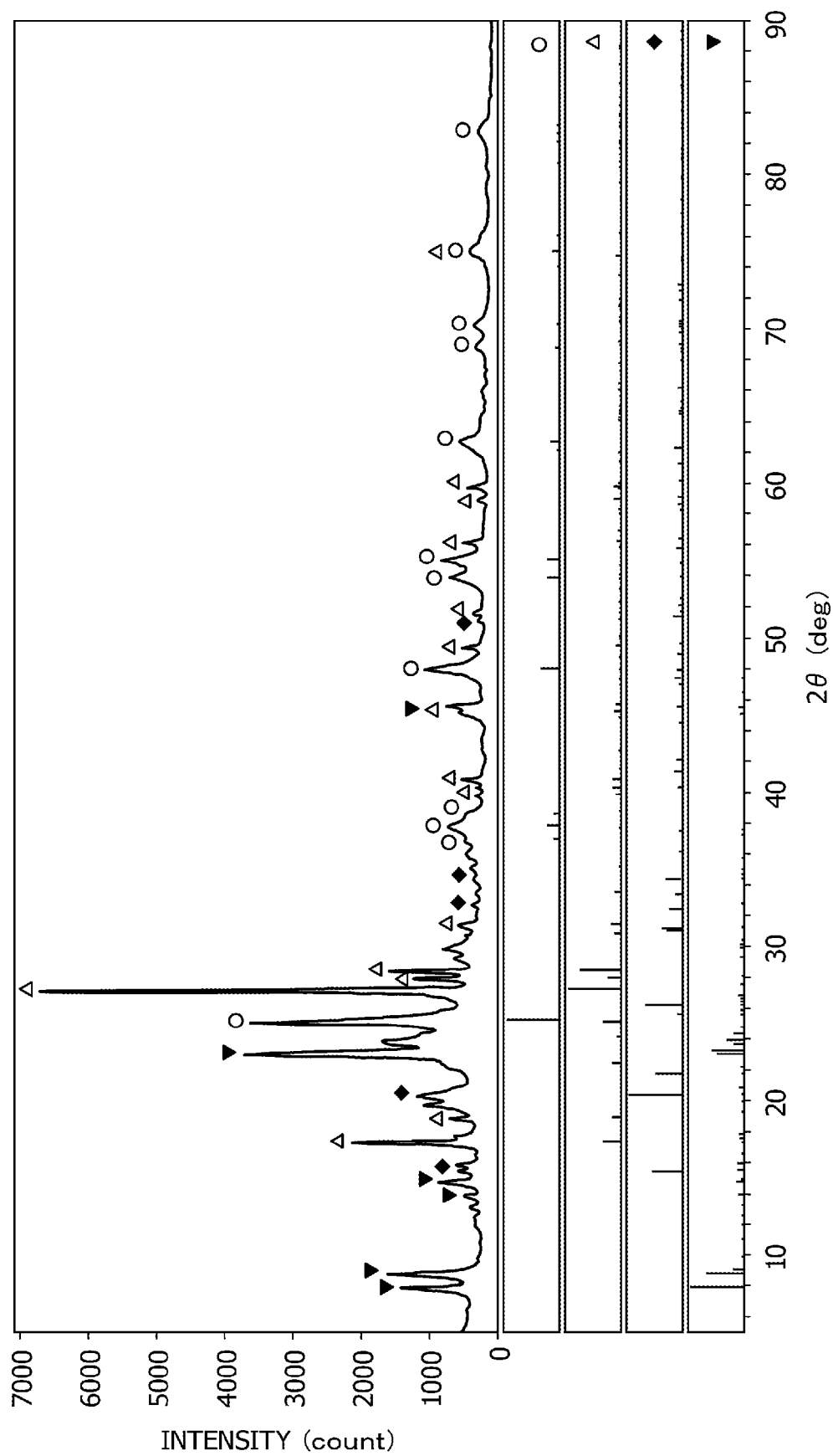
FIG. 4 is a graph showing a surface X-ray diffraction chart of catalyst C according to Comparative Example of the present invention which was exposed to an exhaust gas.

FIGS. 3 and 4 show results of X-ray diffraction analysis of Test Catalysts B and C conducted before the washing.

Table 2 shows results of the regeneration tests conducted by using water and 1 N—HCl (1 normal-hydrochloric acid) as the washing liquids.

The washing effect was evaluated based on the results of visual observation and X-ray diffraction analysis of the surface of each catalyst.

First, visual observation was conducted after the regeneration test. As a result, it was found under the visual observation that the coated material remained in Test Catalyst C, and hence X-ray diffraction results were not conducted thereon. Test Catalyst C was a so-called metallosilicate coating layer, and consequently $VOSO_4$ remained even after the washing.

Figure 5:
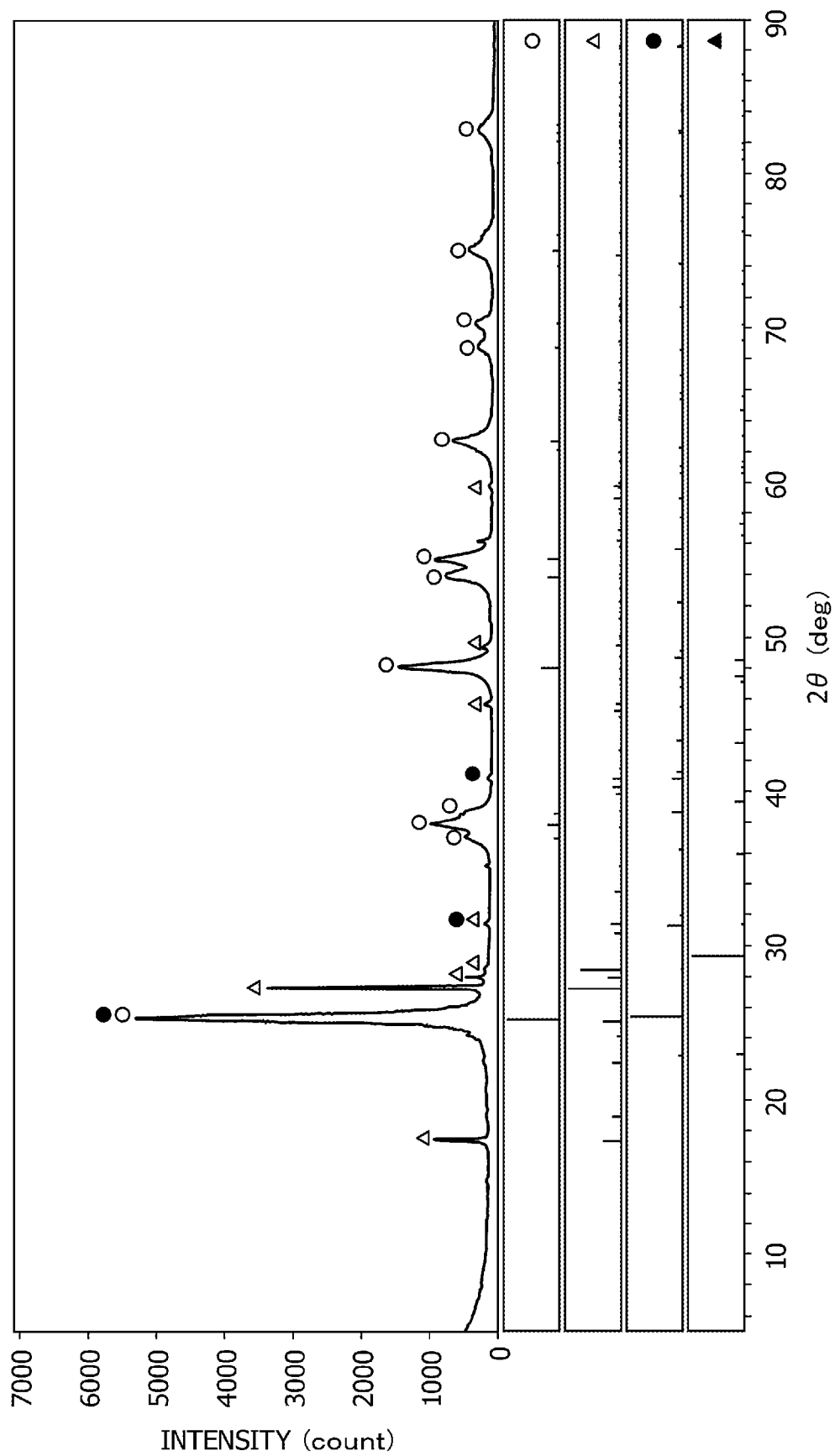
FIG. 5 is a graph showing a surface X-ray diffraction chart of catalyst B according to Example of the present invention which was exposed to an exhaust gas and washed with water.
Figure 6:
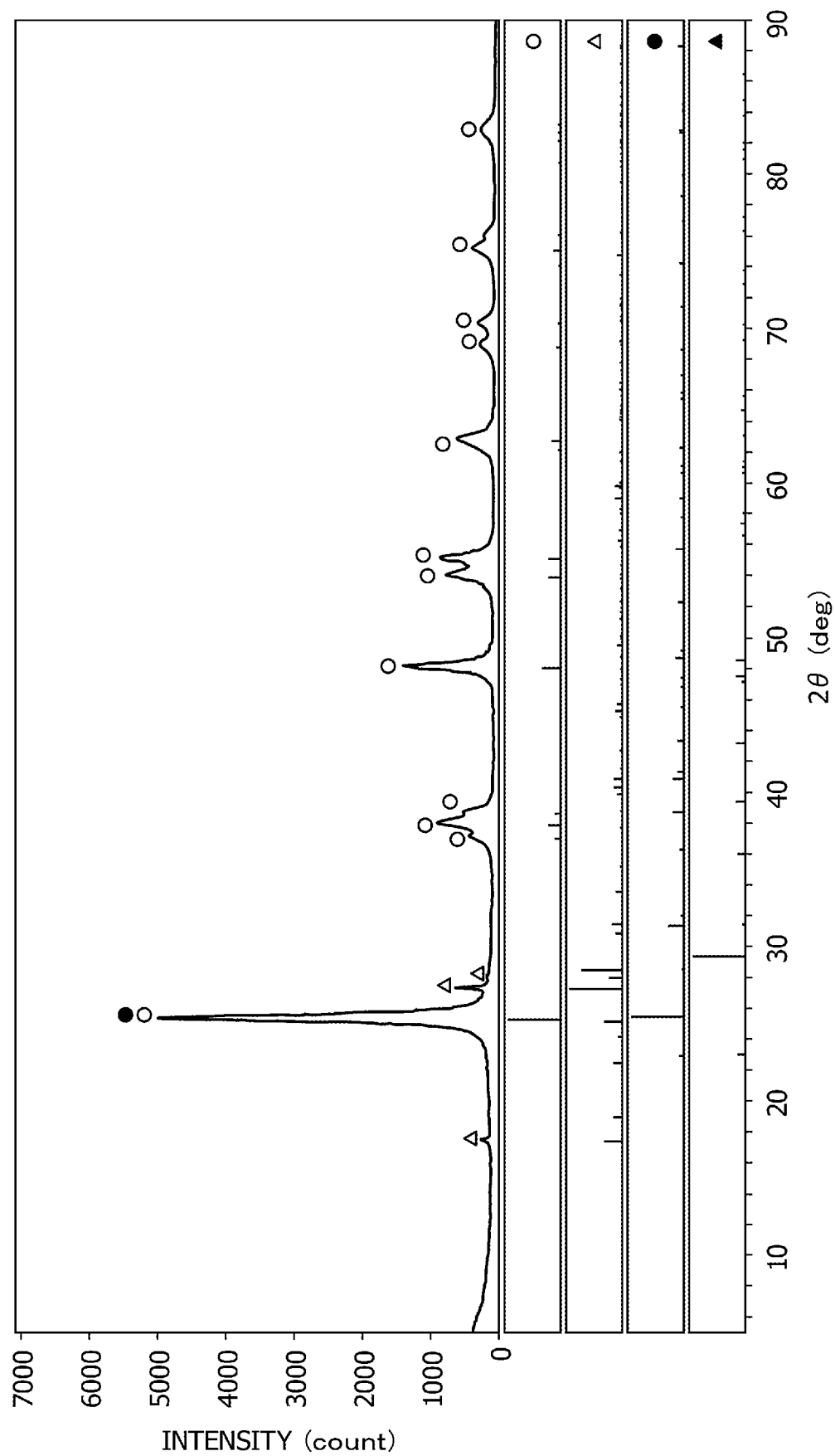
FIG. 6 is a graph showing a surface X-ray diffraction chart of catalyst B according to Example of the present invention which was exposed to an exhaust gas and washed with a HCl solution.

On the other hand, since Test Catalyst B could not be evaluated by the visual observation, the regeneration states thereof were observed by X-ray diffraction analysis (FIGS. 5 and 6). As shown in FIG. 6, it has been found that the coat layer of calcium carbonate can be completely dissolved, and almost all $VOSO_4$, which is hardly soluble in an acid, can be removed by washing with 1 N—HCl (1 normal-hydrochloric acid). As shown in FIG. 5, $VOSO_4$ remained after the washing with water alone.

Note that, in FIGS. 3, 5, and 6, ○ indicates a peak of $TiO_2$, Δ indicates a peak of $VOSO_4$, ● indicates a peak of $CaSO_4$, and ▲ indicates a peak of $CaCO_3$. In FIG. 4, ○ indicates a peak of $TiO_2$, Δ indicates a peak of $VOSO_4$, ◆ indicates a peak of vanadium oxide ($V_2O_5$), and ▼ indicates a peak of the crystalline silicate.

TABLE 2

|  | Test Catalyst B (calcium carbonate) | Test Catalyst C (crystalline silicate) |
|---|---|---|
| Water | X | X |
| 1N-HCl | ○ | X |

Result:
X: Effective,
○: Ineffective

INDUSTRIAL APPLICABILITY

The exhaust gas treatment catalyst and the method for regenerating an exhaust gas treatment catalyst according to the present invention are intended to be used for an extra heavy oil such as Orimulsion, asphalt, or vacuum residual oil (VOR), coal having a high sulfur content, or the like, and are suitable for treating an exhaust gas emitted from a combustion apparatus such as a boiler in which such a high sulfur content fuel is combusted.

REFERENCE SIGNS LIST 1 exhaust gas treatment catalyst
2 de-NOx catalyst layer
3 coating layer
4 $VOSO_4$ molecule
101 catalyst-cutting step
102 washing step
103 drying step
104 surface observation step

The invention claimed is:

1. A method for regenerating an exhaust gas treatment catalyst, in which a coating layer containing at least one selected from the group consisting of alkali metal carbonates and alkaline earth metal carbonates is provided on a surface of a de-NOx catalyst, and $VOSO_4$ is deposited on the coating layer, the method comprising removing only the coating layer of the de-NOx catalyst with an acid.

2. The method for regenerating an exhaust gas treatment catalyst according to claim 1, further comprising, after the removal of the coating layer with the acid, providing again a coating layer containing at least one selected from the group consisting of alkali metal carbonates and alkaline earth metal carbonates.

3. The method for regenerating an exhaust gas treatment catalyst according to claim 2, wherein the coating layer provided again contains calcium carbonate.

4. The method for regenerating an exhaust gas treatment catalyst according to claim 1, wherein hydrochloric acid is used as the acid.

* * * * *